(12) United States Patent
Yuzawa

(10) Patent No.: US 8,184,213 B2
(45) Date of Patent: May 22, 2012

(54) PORTABLE SCREEN

(75) Inventor: Fumio Yuzawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 547 days.

(21) Appl. No.: 12/367,356

(22) Filed: Feb. 6, 2009

(65) Prior Publication Data

US 2009/0201434 A1     Aug. 13, 2009

(30) Foreign Application Priority Data

Feb. 8, 2008 (JP) ................................ 2008-028504
Sep. 30, 2008 (JP) ................................ 2008-252651

(51) Int. Cl.
*H04N 5/64* (2006.01)

(52) U.S. Cl. ....................................... 348/838; 160/377

(58) Field of Classification Search .................. 348/836, 348/837, 838, 839, 840, 841, 842, 843; 160/377
See application file for complete search history.

(56) References Cited

U.S. PATENT DOCUMENTS

| | | | | |
|---|---|---|---|---|
| 1,662,586 A | * | 3/1928 | Newman | 160/351 |
| 2,827,955 A | * | 3/1958 | Hurley | 160/369 |
| 4,110,003 A | * | 8/1978 | Zinn | 359/461 |
| 4,942,686 A | * | 7/1990 | Kemeny | 40/610 |
| 5,510,862 A | * | 4/1996 | Lieberman et al. | 353/119 |
| 6,466,369 B1 | * | 10/2002 | Maddock | 359/460 |
| 6,659,159 B2 | * | 12/2003 | Fritsche et al. | 160/371 |
| 7,397,603 B2 | * | 7/2008 | Peterson et al. | 359/443 |
| 7,889,424 B2 | * | 2/2011 | Suteau | 359/443 |
| 8,024,881 B2 | * | 9/2011 | Redmon | 40/610 |

FOREIGN PATENT DOCUMENTS

| | | |
|---|---|---|
| JP | 2005-221609 A | 8/2005 |
| WO | WO-02-97530 A | 12/2002 |

* cited by examiner

*Primary Examiner* — Jeanette E Chapman
*Assistant Examiner* — James Buckle, Jr.
(74) *Attorney, Agent, or Firm* — AdvantEdge Law Group, LLC

(57) ABSTRACT

A portable screen includes: a frame body having a rectangular shape; and a screen sheet provided with tension within the frame body and having an image projection surface, wherein one opposing side of two sets of opposing sides forming the frame body is configured to allow the frame body to be extendable along the side, and the other opposing side of two sets of opposing sides forming the frame body is configured to allow the frame body to be spreadable or foldable.

10 Claims, 13 Drawing Sheets

PORTABLE SCREEN

BACKGROUND

1. Technical Field

The present invention relates to a portable screen.

2. Related Art

Recently, with downsizing of projectors, portable screens that can be conveniently carried have been in increasing demand. As a portable screen like this, a portable screen in which a frame body can be configured by coupling plural coupling members is disclosed (for example, see JP-A-2005-221609).

However, in a portable screen of a related art, there is a problem that spreading out and folding up the portable screen take a considerable amount of time and effort because, when the portable screen is spread out, it is necessary to form a frame body by coupling plural coupling members and then attach a screen sheet to the frame, and when the portable screen is folded up, it is necessary to detach the screen sheet from the frame body and then take the plural coupling members apart.

SUMMARY

An advantage of some aspects of the invention is to provide a portable screen, and the time and effort taken to spread out and fold up the portable screen can be greatly saved.

A portable screen according to an aspect of the invention includes a frame body having a rectangular shape; and a screen sheet provided with tension within the frame body and having an image projection surface, wherein one opposing side of two sets of opposing sides forming the frame body is configured to allow the frame body to be extendable along the side, and the other opposing side of the two sets of opposing sides forming the frame body is configured to allow the frame body to be spreadable or foldable.

In this case, the one opposing side in the frame body is configured to be extendable, and the other opposing side in the frame body is configured to allow the frame body to be spreadable or foldable. Accordingly, when the portable screen is spread out, the frame body is extended along the direction along the one opposing side (hereinafter, the direction may be referred to as "extending and retracting direction"), the frame body is spread along the direction along the other opposing side (hereinafter, the direction may be referred to as "spreading and folding direction"), and thereby, the portable screen can be spread out to the size on which an image of the projector can be projected with no problem. Further, when the portable screen is folded up, the frame body is folded up in the spreading and folding direction, the frame body is retracted in the extending and retracting direction, and thereby, the portable screen can be reduced to the size that can be carried. That is, the portable screen can be spread out and folded up only by two actions of extending or retracting it along the extending and retracting direction and spreading out or folding up along the spreading and folding direction, the time and effort taken to spread out and fold up the portable screen can be greatly saved.

Further, in this case, the portable screen can be spread out and folded up with the screen sheet remaining attached to the frame body as seen from FIGS. 6A to 6E and 7A to 7E, which will be described later, and thus, the time and effort taken to spread out and fold up the portable screen can be greatly saved in the viewpoint.

Furthermore, in this case, the one opposing side of the frame body is retracted and the other opposite part is folded up, and thus, the size when the portable screen is folded up is relatively small. As a result, the portable screen is very advantageous in portability.

It is preferable that a lock mechanism for maintaining an extended state of the frame body is provided at the one opposing side in the frame body.

When the portable screen is spread out, the extended state of the frame body can be maintained by locking it with the lock mechanism, and, when the portable screen is folded up, the frame body can easily be retracted by releasing the locking of the lock mechanism.

It is preferable that a lock mechanism for maintaining a spread state of the frame body is provided at the other opposing side in the frame body.

When the portable screen is spread out, the spread state of the frame body can be maintained by locking it with the lock mechanism, and, when the portable screen is folded up, the frame body can easily be folded up by releasing the locking of the lock mechanism.

It is preferable that the screen sheet is provided with tension within the frame body to make the image projection surface face inside when the frame body is folded up.

According to the configuration, dirt and scratches on the image projection surface can be suppressed when the portable screen is carried.

It is preferable that the screen sheet is provided with tension in the frame body only at the other opposing side in the frame body, and plural plate-like members are arranged in parallel along the one opposing side direction at two ends of the one opposing side in the frame body of the ends of the screen sheet.

According to the configuration, when the frame body is folded up, the screen sheet is folded up neatly with less distortion and irregular wrinkles generated on the screen sheet can be suppressed.

It is preferable that the number of the plate-like members respectively provided at the two ends in the screen sheet is an odd number.

When the number of the plate-like members provided at the ends of one side in the screen sheet is an odd number, the number of times at which the screen sheet is folded along the extending and retracting direction of the frame body is an even number. If the number is an odd number, for example, one, the screen sheet is folded in a V-shape, and in this case, the frame body and the screen sheet are connected at the other opposing side in the frame body, and the screen sheet is in the unnatural folded state (see FIGS. 8B and 9B, which will be described later).

On the other hand, in this case, the number of times at which the screen sheet is folded along the extending and retracting direction of the frame body is an even number as described above, the screen sheet is neatly folded in the frame body as seen from FIG. 2B, which will be described later. As a result, occurrence of wrinkles and damage on the screen sheet when the screen is carried can be suppressed.

It is preferable that fold-back processing for covering both surfaces of the arranged plate-like members by the screen sheet is performed on the respective two ends in the screen sheet.

According to the configuration, also the parts on which the plate-like members are provided can be widely used as the image projection surface.

Further, if the fold-back processing is not performed on the ends of the screen sheet, when the screen is folded up or when the folded-up screen is carried, the plate-like members may unintentionally be in contact with the screen sheet and damage the screen sheet, however, the occurrence of the damage can be prevented according to the above configuration.

It is preferable that the plate-like member is a plastic plate.

If relatively heavy members are used as the plate-like members, when the frame body is spread out, the ends of the screen sheet may bend or wrinkles may occur. However, in this case, relatively light plastic plates are used for the plate-like members, and thus, bending of the ends of the screen sheet and wrinkles thereon can be suppressed when the frame body is spread out. Further, the effect on the weight of the entire portable screen due to plural plate members provided thereon can be minimized.

It is preferable that the frame body forming the one opposing side includes extendable frames.

According to the configuration, the frame body can be extended and retracted relatively easily along the extending and retracting direction.

It is preferable that the frame body forming the other opposing side includes plural frame pieces, and hinge members that rotatably connect the plural frame pieces, respectively.

According to the configuration, the frame body can be spread out or folded up relatively easily along the spreading and folding direction.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
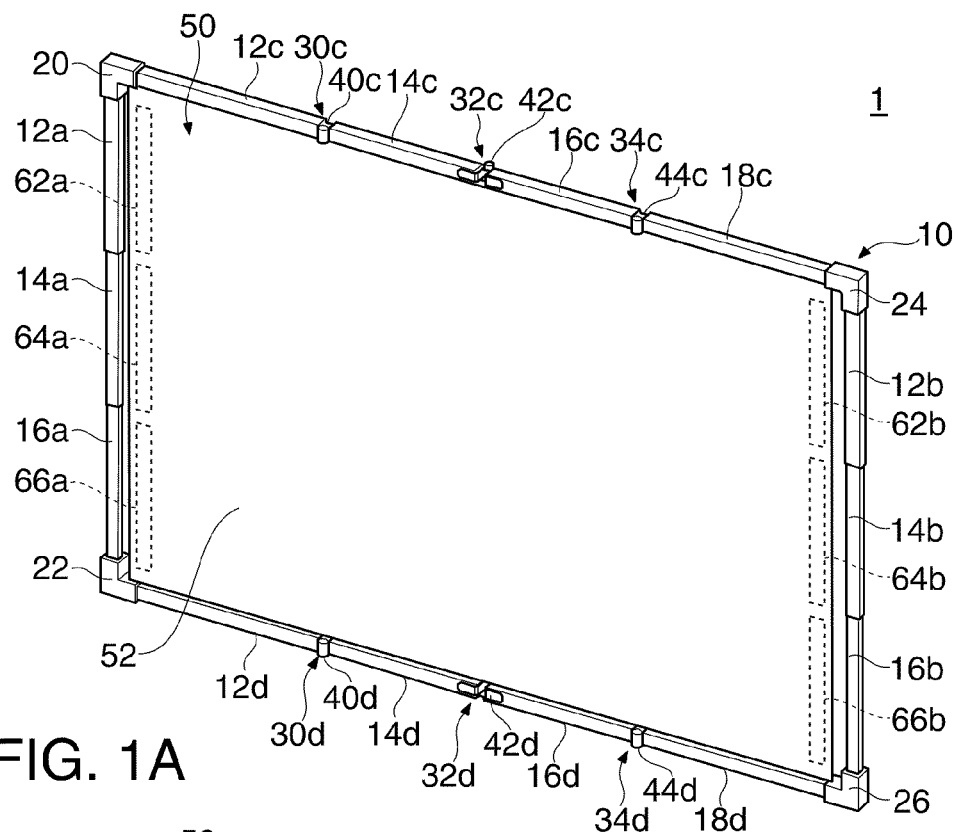
FIGS. 1A and 1B are diagrams for explanation of a portable screen 1 according to embodiment 1.

Hereinafter, a portable screen of an embodiment of the invention will be described according to embodiments shown in the drawings.

Embodiment 1

Figure 1B:
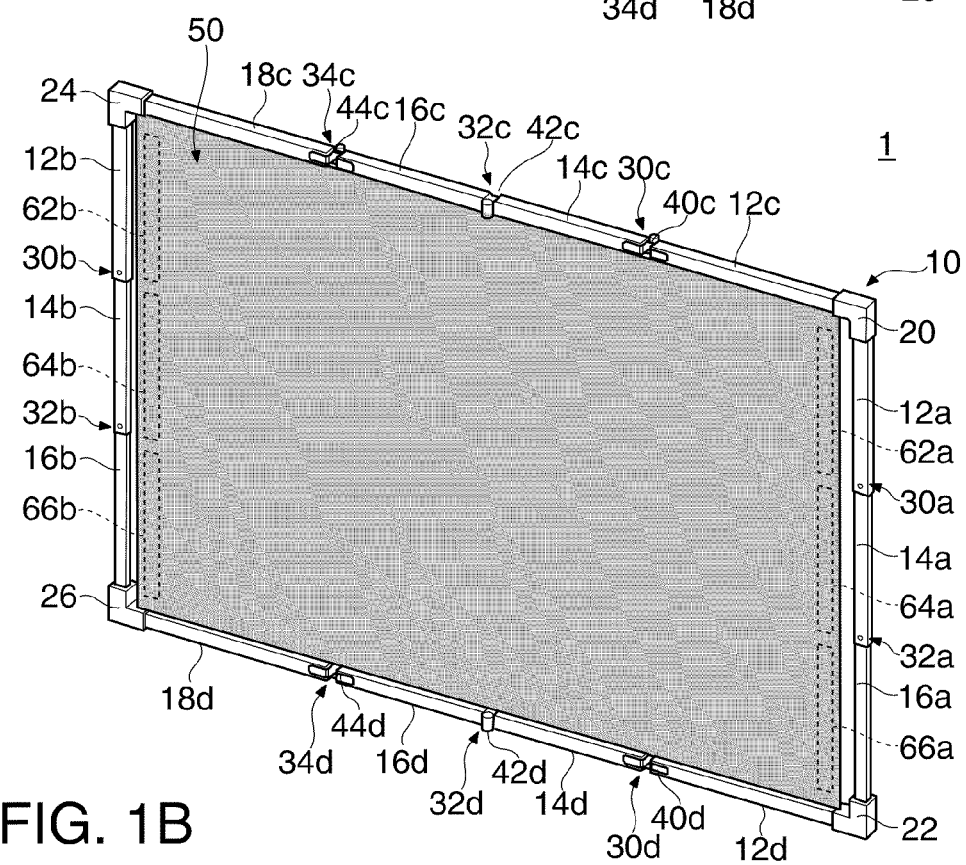
Figure 2A:
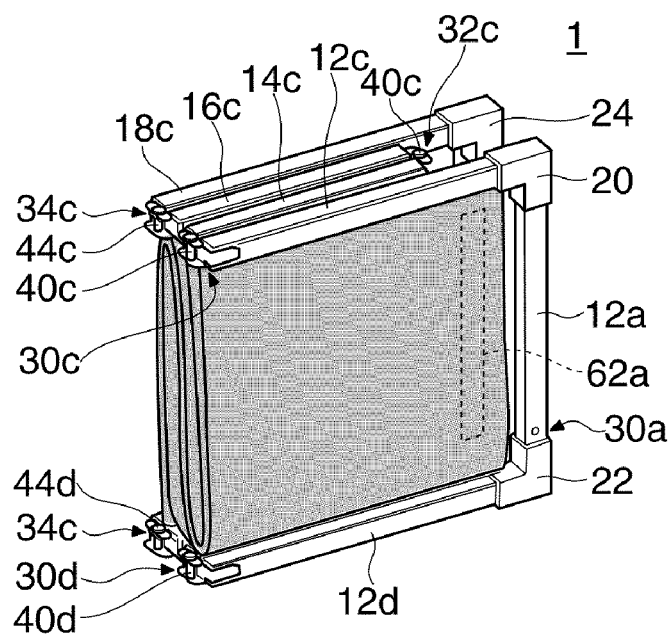
FIGS. 2A and 2B are diagrams for explanation of the portable screen 1 according to embodiment 1.
Figure 2B:
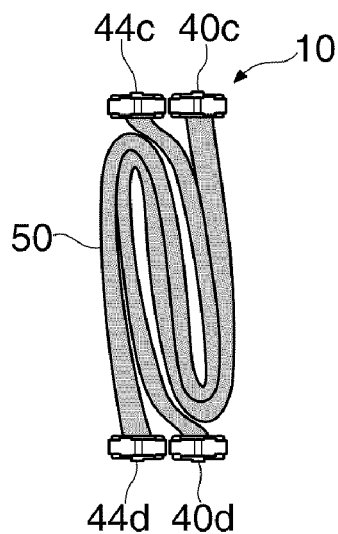

FIGS. 1A, 1B, 2A, and 2B are diagrams for explanation of a portable screen 1 according to embodiment 1. FIG. 1A is a perspective view of the portable screen 1 seen from an image projection surface 52 side, and FIG. 1B is a perspective view of the portable screen 1 seen from an opposing side to the image projection surface 52. FIG. 2A is a perspective view of the portable screen 1 when folded up, and FIG. 2B is a side view of the portable screen 1 for explanation of a folded state of a screen sheet 50.

Figure 3A:
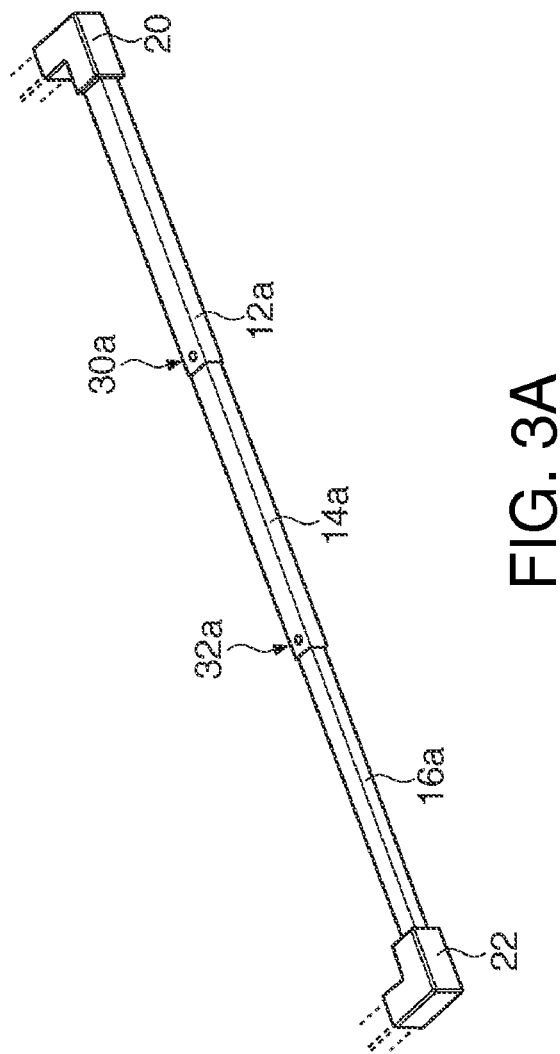
FIGS. 3A and 3B are diagrams for explanation of an extendable frame of the portable screen 1.
Figure 3B:
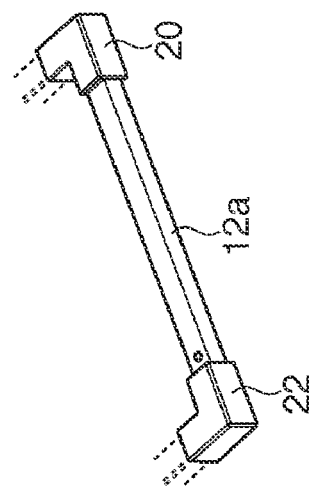

FIGS. 3A and 3B are diagrams for explanation of an extendable frame of the portable screen 1 according to embodiment 1. FIG. 3A is a perspective view showing a state in which frame pieces 12c to 18c are extended, and FIG. 3B is a perspective view showing a state in which frame pieces 12c to 18c are retracted.

Figure 4:
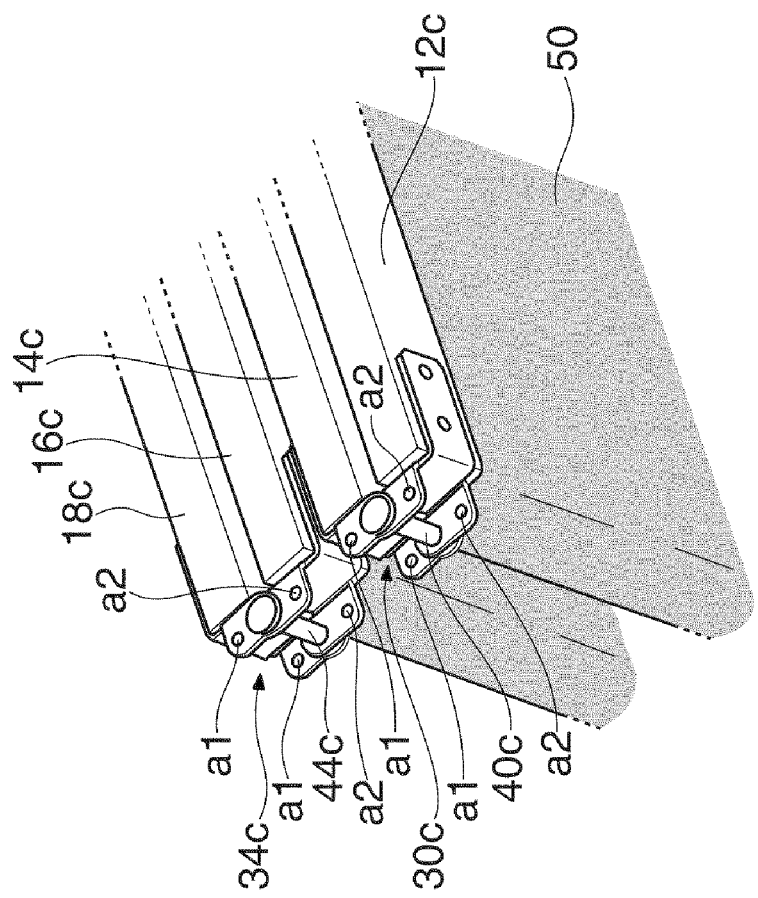
FIG. 4 is a diagram for explanation of hinge members of the portable screen 1.

FIG. 4 is a diagram for explanation of hinge members of the portable screen 1 according to embodiment 1. In FIG. 4, only two hinge members 40c, 44c of plural hinge members are enlarged and shown.

Figure 5A:
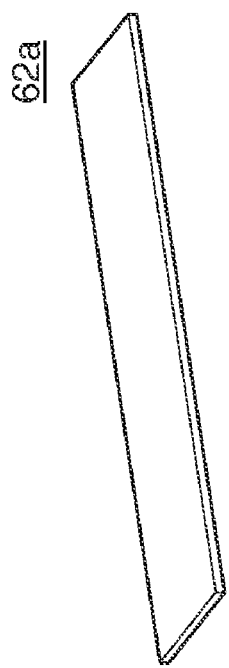
FIGS. 5A and 5B are diagrams for explanation of a plate-like member.
Figure 5B:
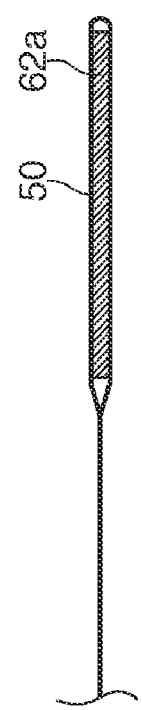

FIGS. 5A and 5B are diagrams for explanation of a plate-like member. FIG. 5A is a perspective view showing a plate-like member 62a, and FIG. 5B is a sectional view of the screen sheet 50 for explanation of fold-back processing in the screen sheet 50.

Note that, regarding the image projection surface 52 of the screen sheet 50 shown in the drawing, to facilitate understanding of the invention, of the two sides of the screen sheet 50, the side on which the image projection surface 52 is formed is shown in white and the side on which the image projection surface 52 is not formed is shown in gray.

The portable screen 1 according to embodiment 1 is a portable screen including a frame body 10 having a rectangular shape in a plan view, the screen sheet 50 provided with tension within the frame body 10, and six plate-like members 62a to 66a, 62b to 66b provided on ends of the screen sheet 50 as shown in FIGS. 1A and 1B.

The frame body 10 has frame pieces 12a to 16a, 12b to 16b provided along the short sides of the frame body 10 by three pieces each, frame pieces 12c to 18c, 12d to 18d provided along the long sides of the frame body 10 by four piece each, respectively, joint members 20 to 26 provided on four corners of the frame body 10 for coupling the respective frame members, hinge members 40c to 44c, 40d to 44d for rotatably coupling the frame pieces 12c to 18c, 12d to 18d, respectively, lock mechanisms 30a, 32a, 30b, 32b provided at the short sides of the frame body 10, and lock mechanisms 30c to 34c, 30d to 34d provided at the long sides of the frame body 10.

Two sides at the short sides of the frame body 10 correspond to "one opposing side" in the invention, and two sides at the long sides of the frame body 10 correspond to "the other opposing side" in the invention.

Further, the direction along the short sides of the frame body 10 correspond to "direction along one opposing sides" or "extending and retracting direction" in the invention, and direction along the long sides of the frame body 10 correspond to "direction along the other opposing sides" or "spreading out and folding up direction" in the invention.

The respective frame pieces 12a to 16a, 12b to 16b provided along the short sides of the frame body 10 are aluminum frames in nearly the same lengths and rectangular sections. These frame pieces 12a to 16a, 12b to 16b are extendable frames adapted to be extendable at two steps along the short sides. At one ends of the frame pieces 12a, 12b, the frame pieces 14a, 14b thinner than the frame pieces 12a, 12b are slidably provided, and, at one ends of the frame pieces 14a, 14b, the frame pieces 16a, 16b thinner than the frame pieces 14a, 14b are slidably provided.

Further, as shown in FIGS. 1B and 3A, the lock mechanism 30a is provided between the frame piece 12a and the frame piece 14a. Also, the lock mechanisms 32a, 30b, 32b are provided between the frame piece 14a and the frame piece 16a, the frame piece 12b and the frame piece 14b, and the frame piece 14b and the frame piece 16b, respectively. These lock mechanisms 30a, 32a, 30b, 32b, though the description with reference to the drawings is omitted, each includes a protrusion that can be pressed down and a fitting hole corresponding to the protrusion, and the protrusion is provided on an end of one frame piece and the fitting hole is provided on an end of the other frame piece. When the frame body 10 is extended along the short sides, locking of the lock mechanisms 30a, 32a, 30b, 32b works by pulling the respective frame pieces 12a to 16a, 12b to 16b until the protrusions reach the positions of the fitting holes. On the other hand, when the frame body 10 is retracted along the short sides, locking of the lock mechanisms 30a, 32a, 30b, 32b is released by pressing down the protrusions. Accordingly, the frame body 10 can be retracted in the directions along the short sides by pushing in the frame pieces 12a to 16a, 12b to 16b.

The respective frame pieces 12c to 18c, 12d to 18d provided along the long sides of the frame body 10 are aluminum frames in rectangular sections. These lengths of the frame pieces 12c, 18c, 12d, 18d are nearly the same lengths and the lengths of the frame pieces 14c, 16c, 14d, 16d are shorter than those of the frame pieces 12c, 18c, 12d, 18d as seen from FIGS. 1A, 1B, and 2A. The hinge members 40c to 44c, 40d to 44d are provided between the respective frame pieces 12c to 18c and between the respective frame pieces 12d to 18d so that, when the frame body 10 is folded, it may be folded in a W-shape, and thereby, the frame body 10 is adapted to be spread out or folded up.

Further, on the respective hinge members 40c to 44c, 40d to 44d, the lock mechanisms 30c to 34c, 30d to 34d are provided. The description of the lock mechanism 30c shown in FIG. 4 is that the lock mechanism 30c includes a protruding part a1 and a fitting part a2 corresponding to the protruding part a1. When the frame body 10 is spread out, the hinge member 40c is rotated and the protruding part a1 is fitted in the fitting part a2, and thereby, the locking of the lock mechanism 30c works. On the other hand, when the frame body 10 is folded up, the hinge member 40c is rotated and fitting of the protruding part a1 in the fitting part a2 is released, and thereby, the locking of the lock mechanism 30c is released. The other lock mechanisms 32c, 34c, 30d to 34d have the same configuration as that of the lock mechanism 30c.

The screen sheet 50 has the image projection surface 52 on one side and provided with tension within the frame body 10 so that the image projection surface 52 may face inside when the frame body 10 is folded up (see FIGS. 7B and 7C described as below). Further, the screen sheet 50 is in contact with the frame pieces 12c to 18c, 12d to 18d but not in contact with the frame pieces 12a to 16a, 12b to 16b as shown in FIGS. 1A and 1B. That is, the screen sheet 50 is provided with tension in the frame body 10 only at the long sides of the frame body 10.

The plate-like member 62a includes a thin transparent plastic plate having a rectangular shape in a plan view as shown in FIG. 5A. The other plate-like members 64a, 66a, 62b to 66b have the same configuration as that of the plate-like member 62a.

The plate-like members 62a to 66a, 62b to 66b are provided at ends along the short sides of the screen sheet 50 by threes, respectively, as shown in FIG. 1. Further, the plate-like members 62a to 66a, 62b to 66b are provided in parallel seen along the long sides. In other words, the arrangements of the plate-like members 62a to 66a, 62b to 66b are symmetrical seen along the straight line passing through the hinge members 42c, 42d.

At the ends along the short sides of the screen sheet 50, fold-back processing for covering both surfaces of the arranged plate-like members 62a to 66a, 62b to 66b by the screen sheet 50 is performed (see FIG. 5B). Note that, the ends of the screen sheet 50 of the fold-back-processed parts may be bonded or stitched.

Here, an operation when the portable screen 1 according to embodiment 1 is spread out and an operation when it is folded up will be described using FIGS. 6A to 6E and 7A to 7E.

Figure 6A:
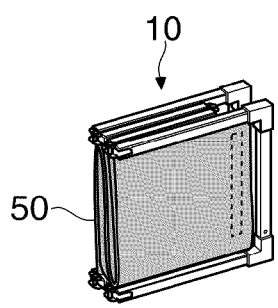
FIGS. 6A to 6E are diagrams for explanation of the operation when the portable screen 1 is spread out.
Figure 6B:
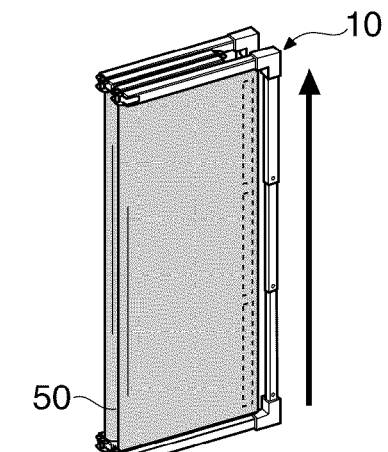
Figure 6C:
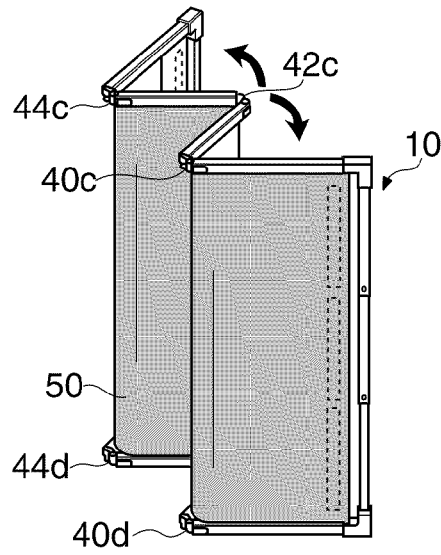
Figure 6D:
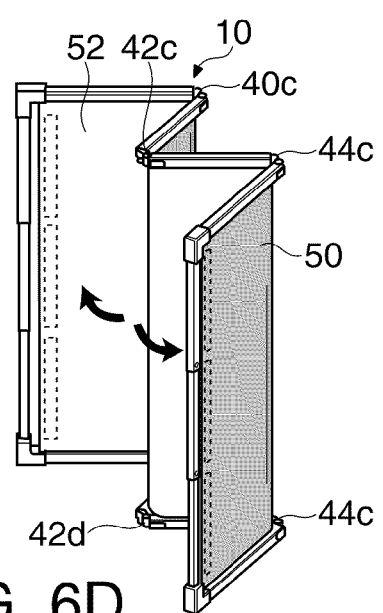
Figure 6E:
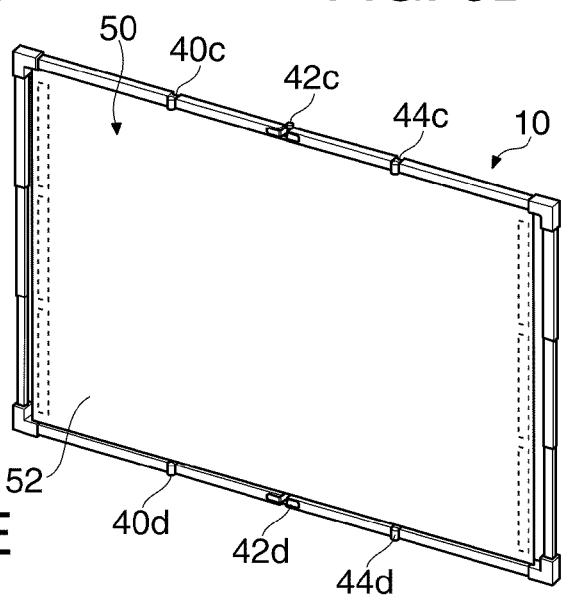

FIGS. 6A to 6E are diagrams for explanation of the operation when the portable screen 1 according to embodiment 1 is spread out. FIG. 6A is a perspective view of the portable screen 1 that has been folded up, FIG. 6B is a perspective view showing a state when the frame body 10 is extended along the short side direction, FIG. 6C is a perspective view showing a state when the frame body 10 is spread along the long side direction, FIG. 6D is a perspective view seen from a different direction from that in FIG. 6C, and FIG. 6E is a perspective view showing a state when the frame body 10 is finished to be spread.

Figure 7A:
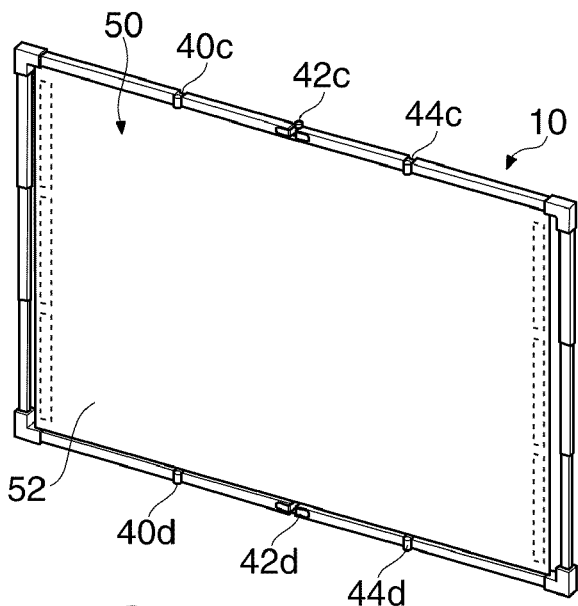
FIGS. 7A to 7E are diagrams for explanation of the operation when the portable screen 1 is folded up.
Figure 7B:
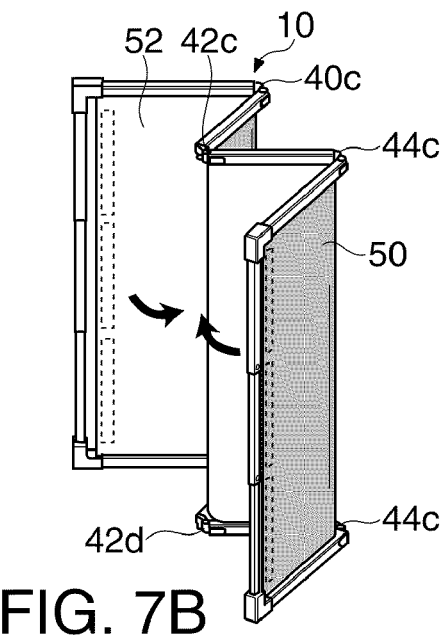
Figure 7C:
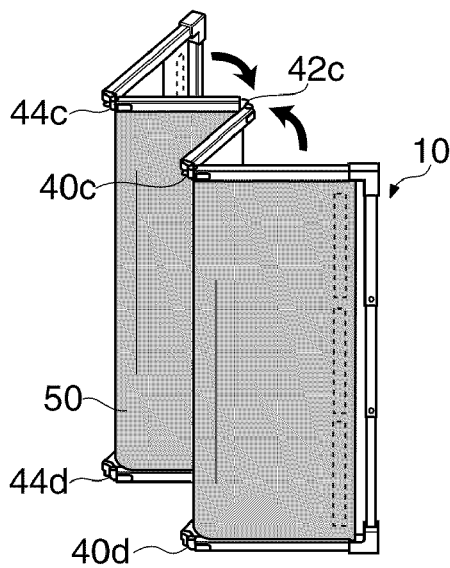
Figure 7D:
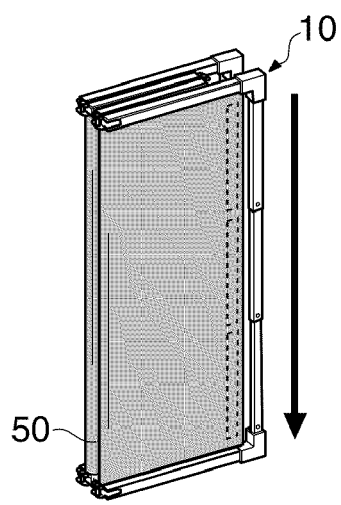
Figure 7E:
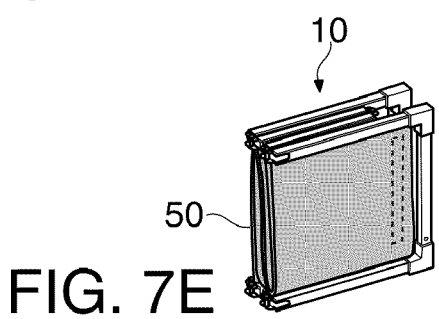

FIGS. 7A to 7E are diagrams for explanation of the operation when the portable screen 1 according to embodiment 1 is folded up. FIG. 7A is a perspective view of the portable screen 1 that has been spread out, FIG. 7B is a perspective view showing a state when the frame body 10 is folded along the long side direction, FIG. 7C is a perspective view seen from a different direction from that in FIG. 7B, FIG. 7D is a perspective view showing a state when the frame body 10 is retracted along the short side direction, and FIG. 7E is a perspective view showing a state when the frame body 10 is finished to be retracted.

When the portable screen 1 in the state shown in FIG. 6A is spread out, the frame body 10 is extended in the direction along the short sides by extending the extendable frames (see FIG. 6B), the frame body 10 is spread out in the direction along the long sides by rotating the hinge members 40c to 44c, 40d to 44d (see FIGS. 6C and 6D), and thereby, the portable screen 1 can be spread out to the size on which an image of the projector can be projected with no problem (e.g., about 40 inches) (see FIG. 6E).

On the other hand, when the portable screen 1 in the state shown in FIG. 7A is folded up, the frame body 10 is folded up by rotating the hinge members 40c to 44c, 40d to 44d (see FIGS. 7B and 7C), the frame body 10 is retracted in the direction along the short sides by retracting the extendable frames (see FIG. 7D), and thereby, the portable screen 1 can be reduced to the size that can be carried (e.g., about A4-size) (see FIG. 7E).

That is, according to the portable screen 1 according to embodiment 1, the portable screen 1 can be spread out and folded up only by two actions of extending or retracting it along the short side direction and spreading out or folding up along the long side direction, the time and effort taken to spread out and fold up the portable screen 1 can be greatly saved.

Further, according to the portable screen 1 according to embodiment 1, the portable screen 1 can be spread out and folded up with the screen sheet 50 remaining attached to the frame body 10 as seen from FIGS. 6A to 6E and 7A to 7E, and thus, the time and effort taken to spread out and fold up the portable screen can be greatly saved in the viewpoint.

Furthermore, according to the portable screen 1 according to embodiment 1, both sides (short sides and long sides) of the frame body 10 having rectangular shapes in the plan view are retracted or folded up, and thus, the size when the portable screen 1 is folded up is relatively small. As a result, the portable screen is very advantageous in portability.

In the portable screen 1 according to embodiment 1, the lock mechanisms 30a, 32a, 30b, 32b for maintaining the extended state of the frame body 10 are provided at the short sides of the frame body 10. Thereby, when the portable screen 1 is spread out, the extended state of the frame body 10 can be maintained by locking it with the lock mechanisms 30a, 32a, 30b, 32b, and, when the portable screen 1 is folded up, the frame body 10 can easily be retracted by releasing the locking of the lock mechanisms 30a, 32a, 30b, 32b.

In the portable screen 1 according to embodiment 1, the lock mechanisms 30c to 34c, 30d to 34d for maintaining the spread state of the frame body 10 are provided at the long sides of the frame body 10. Thereby, when the portable screen 1 is spread out, the spread state of the frame body 10 can be maintained by locking it with the lock mechanisms 30c to 34c, 30d to 34d, and, when the portable screen 1 is folded up, the frame body 10 can easily be folded up by releasing the locking of the lock mechanisms 30c to 34c, 30d to 34d.

In the portable screen 1 according to embodiment 1, the screen sheet 50 is provided with tension within the frame body 10 so that the image projection surface 52 may face inside when the frame body 10 is folded up, and thus, dirt and scratches on the image projection surface 52 can be suppressed when the portable screen 1 is carried.

In the portable screen 1 according to embodiment 1, the ends on which the plural plate-like members 62a to 66a, 62b to 66b are provided, out of the ends of the screen sheet are fold-back-processed as described above, and thus, also the parts on which the plate-like members 62a to 66a, 62b to 66b are provided can be widely used as the image projection surface. Further, when the screen is carried, the damage on the screen sheet, which may occur when the plate-like members are barely provided, can be prevented.

According to the portable screen 1 according to embodiment 1, relatively light plastic plates are used for the plate-like members 62a to 66a, 62b to 66b, and thus, bending of the ends of the screen sheet 50 and wrinkles thereon can be suppressed. Further, the effect on the weight of the entire portable screen due to plural plate members provided thereon can be minimized.

In the portable screen 1 according to embodiment 1, the frame body 10 forming the short sides includes extendable frames, and thus, the frame body 10 can relatively easily be extended and retracted along the short side direction.

In the portable screen 1 according to embodiment 1, the frame body 10 forming the long sides has the frame pieces 12c to 18c, 12d to 18d and the hinge members 40c to 44c, 40d to 44d that rotatably couple the frame pieces 12c to 18c, 12d to 18d, and thus, the frame body 10 can relatively easily be spread out or folded up along the long side direction.

In the portable screen 1 according to embodiment 1, the frame pieces include aluminum frames, and thus, the relatively high frame strength can be obtained.

In the portable screen 1 according to embodiment 1, the screen sheet 50 is provided with tension only at the long sides of the frame body 10, i.e., the sides on which the hinge members 40c to 44c, 40d to 44d are provided, and the above described plural plate-like members 62a to 66a, 62b to 66b are provided at the ends of the short sides of the screen sheet.

Thereby, when the frame body 10 is folded up, the screen sheet 50 is folded up neatly with less distortion and irregular wrinkles generated on the screen sheet 50 can be suppressed.

Here, the portable screen 1 according to the embodiment will be described in further detail with a portable screen according to comparative examples of embodiment 1.

Figure 8A:
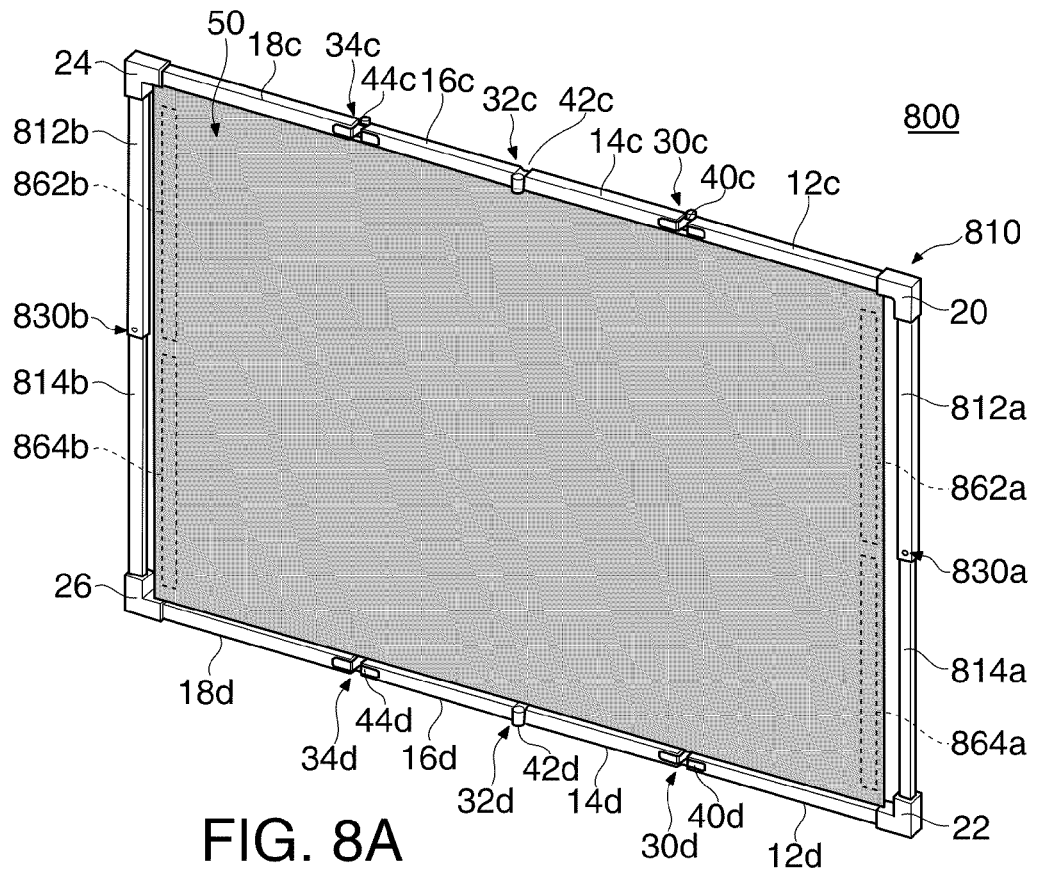
FIGS. 8A and 8B are diagrams for explanation of a portable screen 800 according to comparative example 1.
Figure 8B:
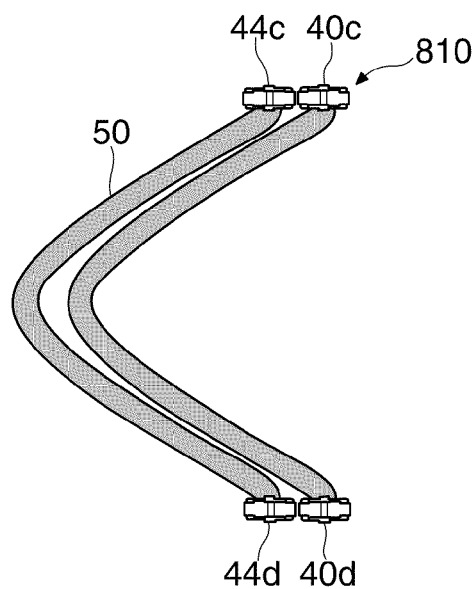

FIGS. 8A and 8B are diagrams for explanation of a portable screen 800 according to comparative example 1. FIG. 8A is a perspective view of the portable screen 800, and FIG. 8B is a side view of the portable screen 800 for explanation of a folded-up state of the screen sheet 50.

Figure 9A:
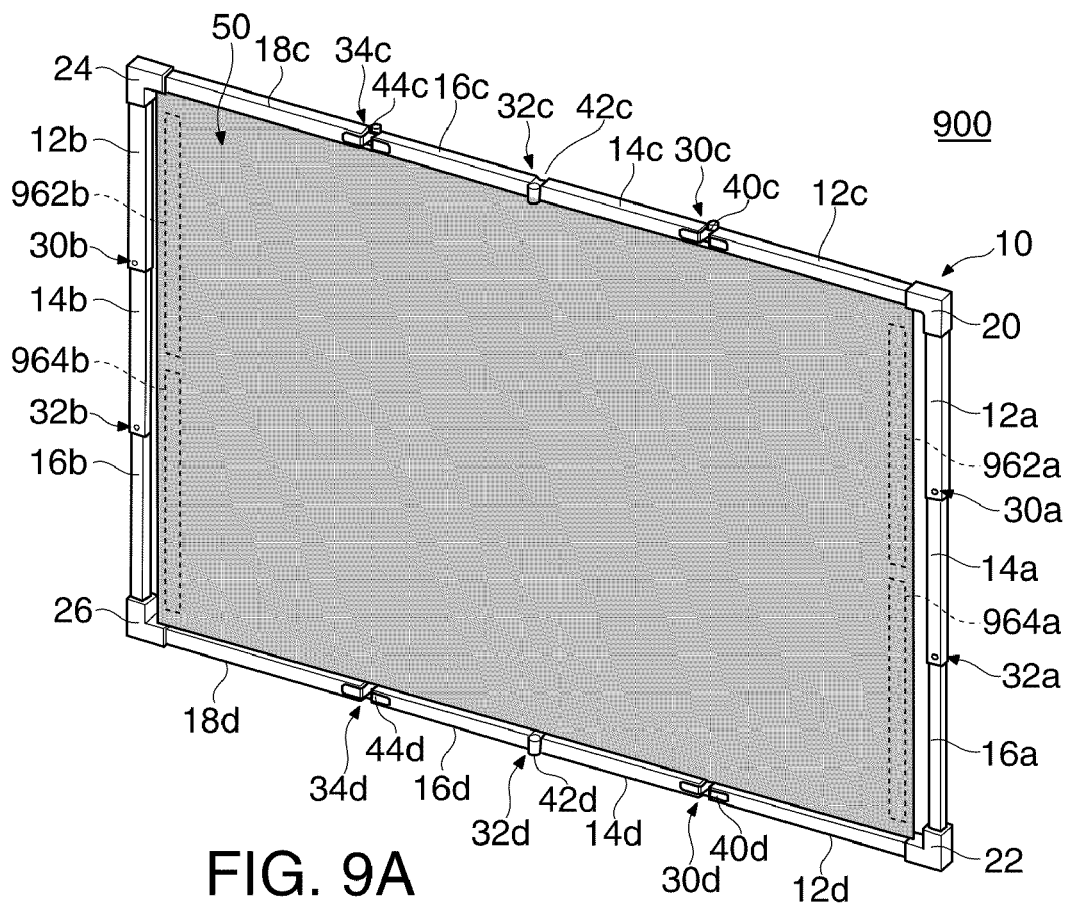
FIGS. 9A and 9B are diagrams for explanation of a portable screen 900 according to comparative example 2.
Figure 9B:
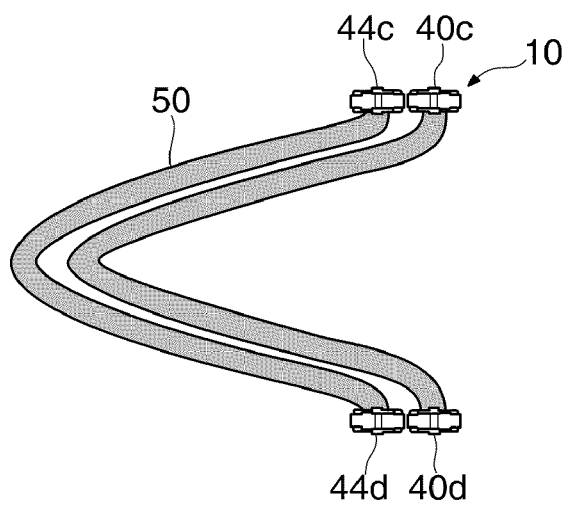

FIGS. 9A and 9B are diagrams for explanation of a portable screen 900 according to comparative example 2. FIG. 9A is a perspective view of the portable screen 900, and FIG. 9B is a side view of the portable screen 900 for explanation of a folded-up state of the screen sheet 50.

In FIGS. 8A, 8B, 9A, and 9B, the same signs are assigned to the same members as those in FIGS. 1A and 1B, and the detailed description will be omitted.

The portable screen 800 according to comparative example 1 basically has the same configuration as that of the portable screen 1 according to the embodiment, but differs in the configuration of the extendable frames and the number of the plate-like members from the portable screen 1 according to the embodiment.

That is, in the portable screen 800 according to comparative example 1, as shown in FIG. 8A, the number of frame pieces provided along the short side direction of a frame body 810 are two, respectively, and they are formed to be extendable only at one step. Further, plate-like members 862a, 864a, 862b, 864b are provided at ends at the short sides of the frame body 10 by two pieces each, according to the number of the frame pieces provided along the short side direction. Further, the lengths of the plate-like members 862a, 864a, 862b, 864b are nearly the same as lengths of the frame pieces 812a, 814a, 812b, 814b, and the lengths of the plate-like members 862a, 864a, 862b, 864b correspond to the lengths of the frame pieces 812a, 814a, 812b, 814b.

When the portable screen 800 according to comparative example 1 having the above configuration is folded up, because the number of the plate-like members provided at the ends of one side of the screen sheet 50 is two, the number of times at which the screen sheet 50 is folded is one, and the screen sheet 50 is folded in a V-shape as shown in FIG. 8B. In this regard, since the frame body 810 and the screen sheet 50 are connected at the long sides of the frame body 810, the screen sheet 50 is in the unnatural folded state (the screen sheet 50 protrudes from the frame body 810). Further, since the extendable frames are extended or retracted at one step only, the lengths in the short side direction (extending and retracting direction) when the portable screen 800 is folded up is relatively long, and the size of the portable screen 800 when folded up is larger than that of the portable screen 1 according to embodiment 1.

Further, the portable screen 900 according to comparative example 2 basically has the same configuration as that of the portable screen 1 according to the embodiment, but differs in the number of the plate-like members from the portable screen 1 according to the embodiment.

That is, in the portable screen 900 according to comparative example 2, as shown in FIG. 9A, plate-like members 962a, 964a, 962b, 964b are provided at ends at the short sides of the screen sheet 50 by two pieces each. The lengths of the plate-like members 962a, 964a, 962b, 964b are longer than the lengths of the frame pieces 12a to 16a, 12b to 16b.

When the portable screen 900 according to comparative example 2 having the above configuration is folded up, because the number of the plate-like members provided at the ends of one side of the screen sheet 50 is two, the number of times at which the screen sheet 50 is folded is one, and the screen sheet 50 is folded in a V-shape as shown in FIG. 9B. In this regard, since the frame body 10 and the screen sheet 50 are connected at the long sides of the frame body 10, the screen sheet 50 is in the unnatural folded state (the screen sheet 50 protrudes from the frame body 10). Further, since the lengths of the plate-like members 962*a*, 964*a*, 962*b*, 964*b* do not correspond to the lengths of the frame pieces 12*a* to 16*a*, 12*b* to 16*b*, the screen sheet 50 more greatly protrudes from the frame body 10 than in the case of the portable screen 800 of comparative example 1.

On the other hand, according to the portable screen 1 according to embodiment 1, since the number of the plate-like members provided at the ends of one side of the screen sheet 50 is three, the number of times at which the screen sheet 50 is folded is two, and the screen sheet 50 is neatly folded nearly in an N-shape within the frame body 10 as shown in FIG. 2B. Further, the lengths of the plate-like members 62*a* to 66*a*, 62*b* to 66*b* correspond to the lengths of the lengths of the frame pieces 12*a* to 16*a*, 12*b* to 16*b*, and thereby, the screen sheet 50 is neatly folded within the frame body for that reason. As a result, occurrence of wrinkles and damage on the screen sheet 50 when the screen is carried can be suppressed.

Embodiment 2

Figure 10A:
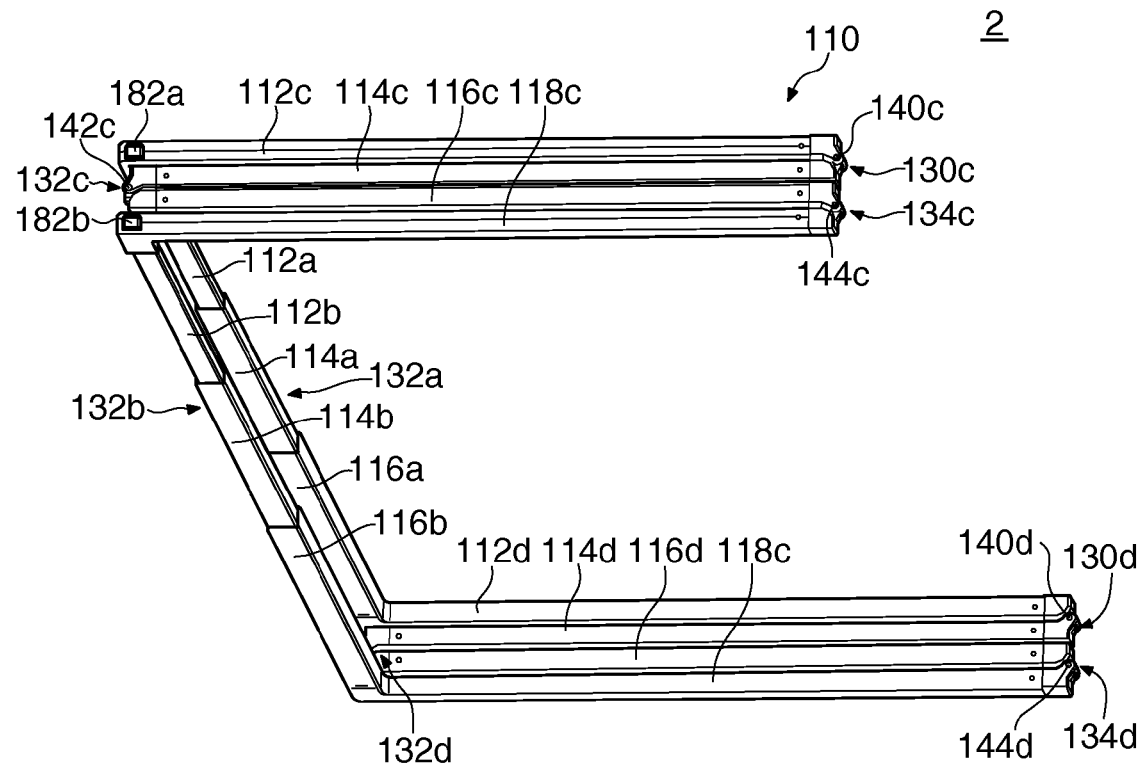
FIGS. 10A and 10B are diagrams for explanation of a portable screen 2 according to embodiment 2.
Figure 10B:
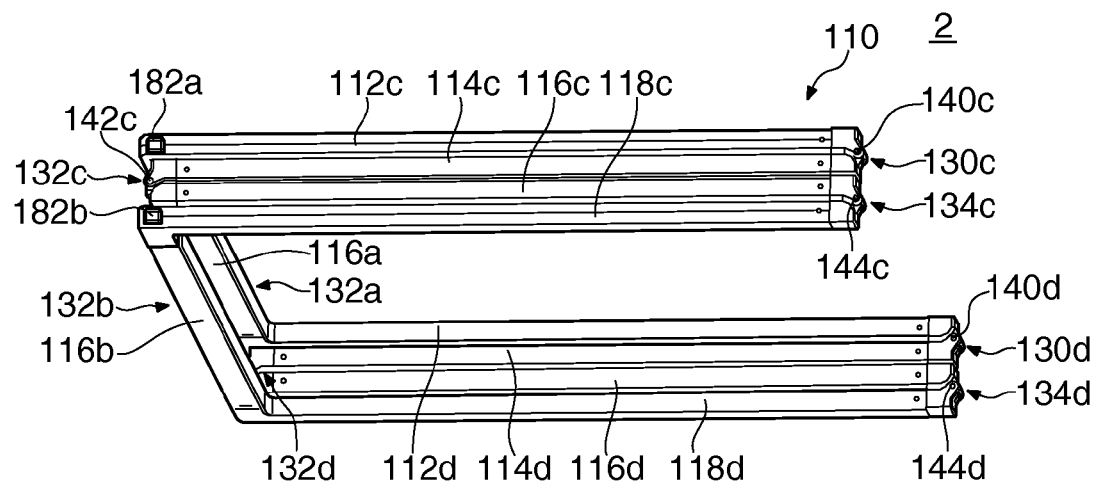

FIGS. 10A and 10B are diagrams for explanation of a portable screen 2 according to embodiment 2. FIG. 10A is a perspective view showing a state in which frame pieces 112*a* to 116*a*, 112*b* to 116*b* are extended, and FIG. 10B is a perspective view showing a state in which the frame pieces 112*a* to 116*a*, 112*b* to 116*b* are retracted. In FIGS. 10A and 10B, the screen sheet is omitted to be shown.

Figures 11A, 11B:
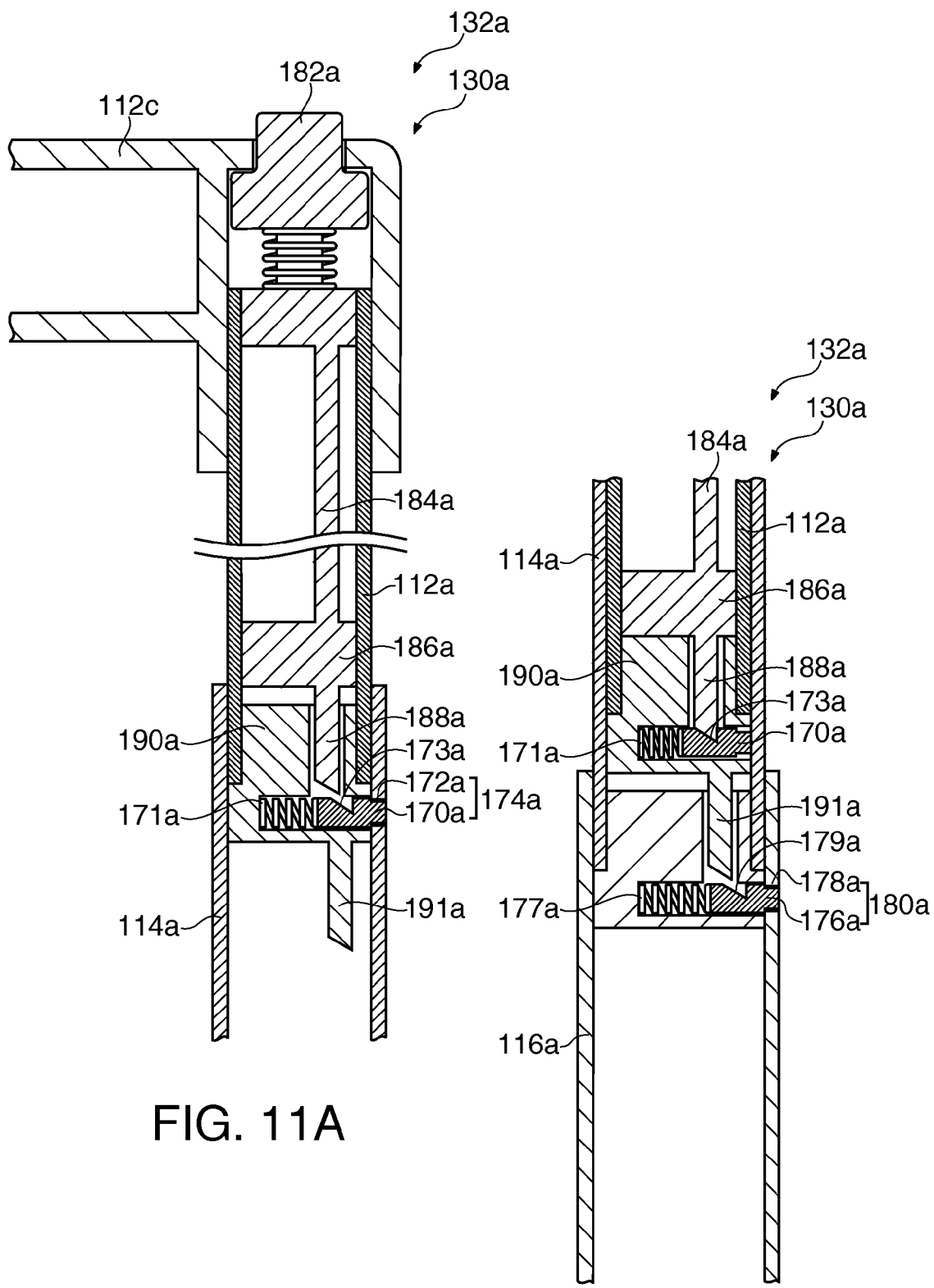
FIGS. 11A and 11B are diagrams for explanation of a lock mechanism 130a for maintaining the extended state of the frame body in the portable screen 2 according to embodiment 2.

FIGS. 11A and 11B are diagrams for explanation of a lock mechanism 130*a* for maintaining the extended state of the frame body in the portable screen 2 according to embodiment 2. FIG. 11A shows a first lock mechanism 174*a* for locking the frame piece 112*a* and the frame piece 114*a*, and FIG. 11B shows a second lock mechanism 180*a* for locking the frame piece 114*a* and the frame piece 116*a*.

Figure 12A:
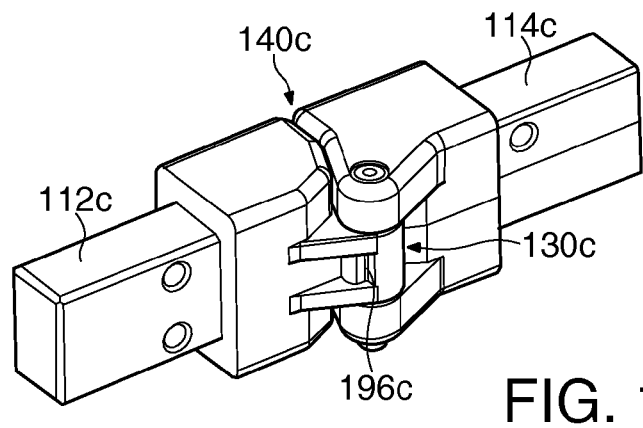
FIGS. 12A to 12C are diagrams for explanation of a lock mechanism 130c for maintaining the spread state of the frame body in the portable screen 2 according to embodiment 2.
Figure 12B:
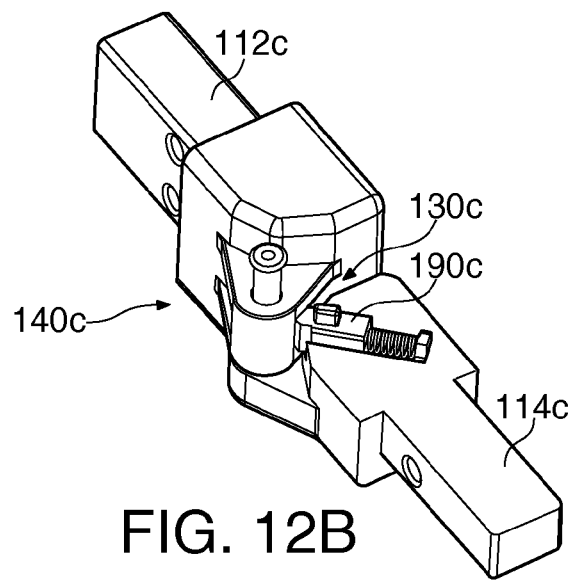
Figure 12C:
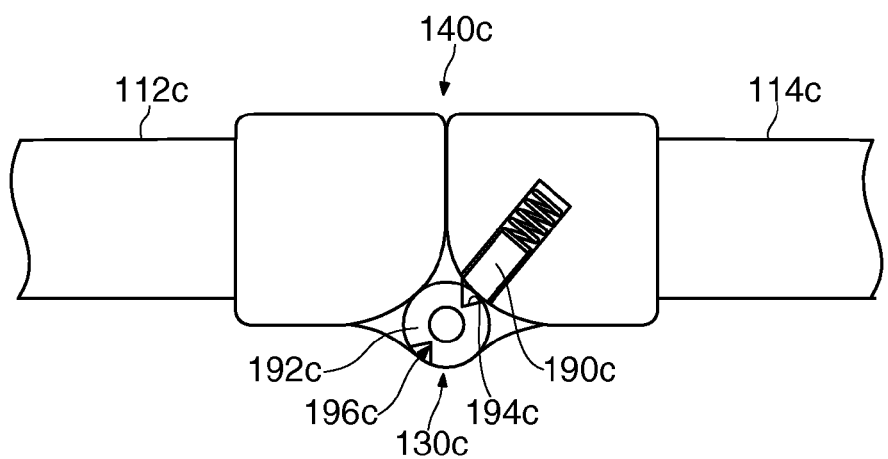

FIGS. 12A to 12C are diagrams for explanation of a lock mechanism 130*c* for maintaining the spread state of the frame body in the portable screen 2 according to embodiment 2. FIG. 12A is a perspective view of a hinge member 140*c*, FIG. 12B is a perspective view of the hinge member 140*c* seen from a different angle from that in FIG. 12A, and FIG. 12C schematically shows the lock mechanism 130*c*. In FIGS. 12A to 12C, only one hinge member 140*c* of the plural hinge members is enlarged and shown.

Figure 13A:
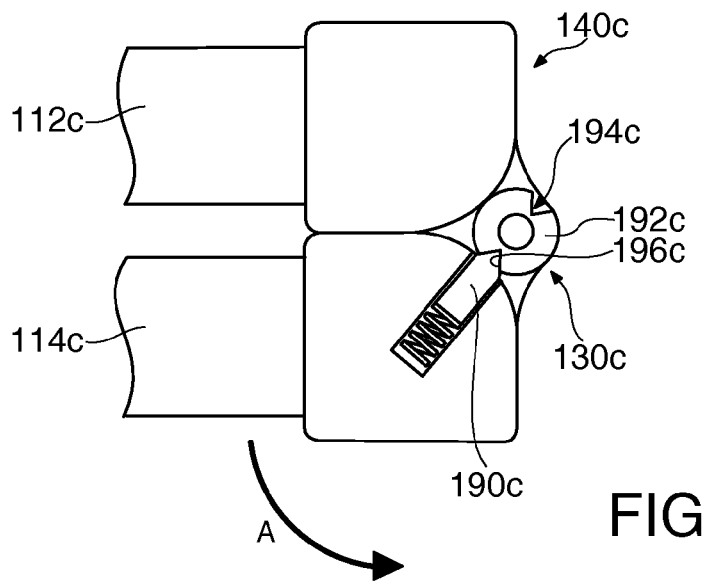
FIGS. 13A to 13C are diagrams for explanation of the lock mechanism 130c for maintaining the spread state of the frame body in the portable screen 2 according to embodiment 2.
Figure 13B:
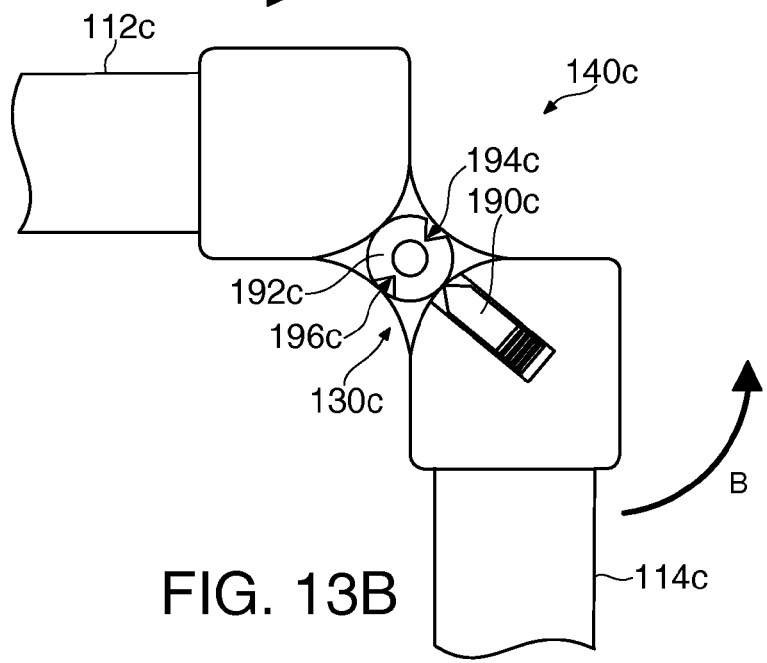
Figure 13C:
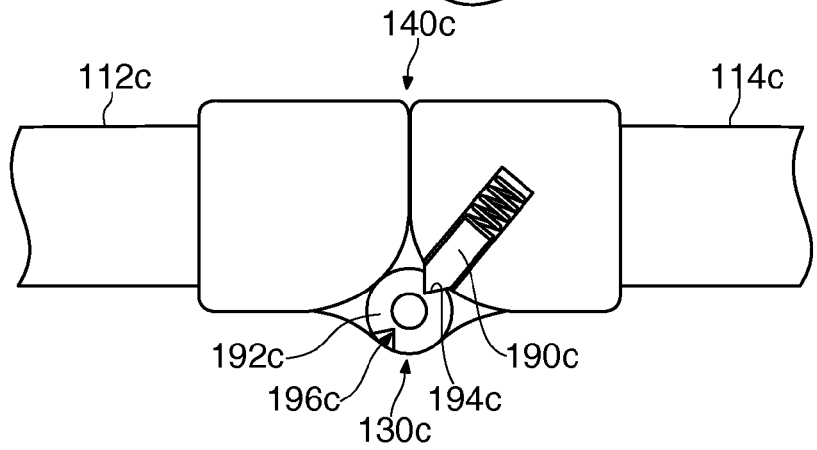

FIG. 13A to 13C are diagrams for explanation of the lock mechanism 130*c* for maintaining the spread state of the frame body in the portable screen 2 according to embodiment 2. FIG. 13A shows the lock mechanism 130*c* when the portable screen 2 is folded up, FIG. 13B shows the lock mechanism 130*c* in the process of spreading out the portable screen 2, and FIG. 13C shows the lock mechanism 130*c* when the portable screen 2 is spread out.

The portable screen 2 according to embodiment 2 basically has the same configuration as that of the portable screen 1 according to the embodiment, but differs in the configuration of the lock mechanism for maintaining the extended state of the frame body and the configuration of the lock mechanism for maintaining the spread state of the frame body from the portable screen 1 according to embodiment 1.

That is, in the portable screen 2 according to embodiment 2, the lock mechanism 130*a* for maintaining the extended state of the frame body includes the first lock mechanism 174*a* (a lock pin 170*a* and a fitting hole 172*a*) for locking the frame piece 112*a* and the frame piece 114*a*, the second lock mechanism 180*a* (a lock pin 176*a* and a fitting hole 178*a*) for locking the frame piece 114*a* and the frame piece 116*a*, a lock release button 182*a* provided in the upper part of an extendable frame 132*a*, a first lock release member 184*a* connected to the lock release button 182*a* for releasing the locking of the first lock mechanism 174*a* and a second lock release member 190*a* for releasing the locking of the second lock mechanism 180*a* as shown in FIGS. 10A, 10B, 11A, and 11B.

The first lock release member 184*a* has a guide part 186*a* for guiding the first lock release member 184*a* to move within the frame piece 112*a* and a lock release part 188*a* for fitting in a recessed portion 173*a* of the lock pin 170*a* and releasing the locking of the first lock mechanism 174*a*. Further, the second lock release member 190*a* has a lock release part 191*a* attached to the frame piece 112*a* for fitting into a recessed portion of the 179*a* of the lock pin 176*a* and releasing the second lock mechanism 180*a*. Springs 171*a*, 177*a* are connected to the lock pins 170*a*, 176*a*, respectively, and the respective lock pins 170*a*, 176*a* are urged toward the inner surfaces of the frame pieces 114*a*, 116*a* by the elastic force of the springs 171*a*, 177*a*. When the positions of the respective fitting holes 172*a*, 178*a* coincide with the positions of the lock pins 170*a*, 176*a*, the respective lock pins 170*a*, 176*a* fit in the fitting holes 172*a*, 178*a*, respectively. The lock mechanism 130*b* has the same configuration as that of the lock mechanism 130*a*.

In the portable screen 2 according to embodiment 2, by pulling the respective frame pieces 112*a* to 116*a* until the lock pins 170*a*, 176*a* come to the position of the respective fitting holes 172*a*, 178*a* formed to the frames 114*a*, 116*a*, locking of the lock mechanism 130*a* (the first lock mechanism 174*a* and the second lock mechanism 180*a*) works and the frame body 110 can be maintained in the state extended in the direction along the short sides (see FIG. 10A).

Further, by pressing the lock release button 182*a*, the first lock release member 184*a* moves downwardly, the lock release part 188*a* fits into the recessed portion 173*a* of the lock pin 170*a*, and the fitting of the lock pin 170*a* in the fitting hole 172*a* is released. As a result, the frame piece 114*a* becomes movable relative to the frame piece 112*a* and the frame body 110 can be retracted in the direction along the short sides.

Furthermore, by applying force to press the frame piece 112*a* into the frame piece 114*a*, the second lock release member 190*a* connected to the frame piece 112*a* moves downwardly, the lock release part 191*a* fits into the recessed portion 179*a* of the lock pin 176*a*, and the fitting of the lock pin 176*a* in the fitting hole 178*a* is released. As a result, the frame piece 116*a* becomes movable relative to the frame piece 114*a* and the frame body 110 can be further retracted in the direction along the short sides (see FIG. 10B).

The reliability and operability of the lock operation and lock release operation of the lock mechanism 130*a* (the first lock mechanism 174*a* and the second lock mechanism 180*a*) may be adjusted by the elasticity of the springs, the shapes of the lock pins 170*a*, 176*a*, the shapes of the fitting holes 172*a*, 178*a*, or the like.

In the portable screen 2 according to embodiment 2, the lock mechanism 130*c* for maintaining the spread state of the frame body has a lock pin 190*c* having a recessed portion at its leading end, and a cylindrical member 192*c* fixed to the frame piece 112*c* and having two grooves 194*c*, 196*c* formed diagonal positions as shown in FIGS. 12A to 12C. A spring is connected to the lock pin 190*c* so that the lock pin 190*c* may fit in one of the two grooves 194*c*, 196*c* by the elastic force of the spring. The other lock mechanisms 132c, 134c, 130d to 134d have the same configuration as that of the lock mechanism 130c.

In the portable screen 2 according to embodiment 2, as shown in FIGS. 13A to 13C, from the locked state in which the frame pieces 112c and 114c are folded and the lock pin 190c fits into the groove 196c, the hinge member 140c is rotated in a direction of arrow A, and thereby, the fitting state of the lock pin 190c and the groove 196c is released and the locking of the lock mechanism 130c is released. Further, in this state, by further rotating the hinge member 140c in a direction of arrow B, the lock pin 190c slidingly moves on the side surface of the cylindrical member 192c. Then, when the frame body 110 is in the spread-out state, the lock pin 190c fits in the groove 194c and the locking of the lock mechanism 130c works again. As a result, the spread-out state of the frame body 110 is maintained.

Further, by rotating the hinge member 140c in an opposite direction to the arrow B, the fitting state of the lock pin 190c and the groove 194c is released and the locking of the lock mechanism 130c is released. Furthermore, in this state, by further rotating the hinge member 140c in the opposite direction to the arrow A to make the folded-up state of the frame body 110, the lock pin 190c fits in the groove 194c and the locking of the lock mechanism 130c works again. As a result, the folded-up state of the frame body 110 is maintained.

The reliability and operability of the lock operation and lock release operation in the lock mechanism 130c may be adjusted by the magnitude of the elastic force of the spring, the shapes of the recessed portion in the lock pin 190c, the shapes of the grooves 194c, 196c, or the like.

As described above, in the portable screen 2 according to embodiment 2, the lock mechanism for maintaining the extended state of the frame body and the lock mechanism for maintaining the spread state of the frame body are different in configuration from the case of the portable screen 1 according to embodiment 1. However, as is the case of the portable screen 1 according to embodiment 1, the portable screen can be spread out and folded up only by two actions of extending or retracting it along the short side direction and spreading out or folding up along the long side direction, and thus, the time and effort taken to spread out and fold up the portable screen can be greatly saved.

Further, according to the portable screen 2 according to embodiment 2, since the first locking release member 184a is connected to the lock release button 182a and the second lock release member 190a is integrated with the frame piece 112a, the release operation for the locking in the two lock mechanisms (the first lock mechanism 174a and the second lock mechanism 180a) can be performed by easy operations.

Furthermore, since the portable screen 2 according to embodiment 2 has the lock mechanism 130c having the lock pin 190c having the recessed portion at its leading end and the cylindrical member 192c having two grooves 194c, 196c, the operations of making the spread-out state and the folded-up state of the frame body can be performed by reliable and easy operations.

The portable screen 2 according to embodiment 2 has the same configuration as that of the portable screen 1 according to embodiment 1 except that the configuration of the lock mechanism for maintaining the extended state of the frame body and the lock mechanism for maintaining the spread state of the frame body is different, and thus, has the corresponding advantages of the advantages that the portable screen 1 according to embodiment 1 has.

As above, the portable screen of the embodiment of the invention has been described based on the embodiments, but the invention is not limited to the above embodiments and can be implemented in various embodiments without departing the scope of the invention and the following modifications can be made, for example.

The case where the frame body has a rectangular shape in a plan view has been described as an example in the embodiments, however, the invention is not limited to that, but other shapes such as a circular shape may be adopted, for example.

The case where the short side part includes three frame pieces and the long side part includes four frame pieces has been described as an example in the embodiments, however, the invention is not limited to that, but the larger number of frame pieces than that described in the embodiments may be included.

The case where the short side part includes extendable frames as the configuration extendable in the frame body has been described as an example in the embodiments, however, the invention is not limited to that, but other means may be used as long as the frame body can be extended and retracted. Further, the case where the long side part includes the hinge members as the configuration that can be spread out or folded up in the frame body has been described as an example in the embodiments, however, the invention is not limited to that, but other means may be used as long as the frame body can be spread out and folded up.

The lock mechanism including the protruding portion and the fitting hole has been described as an example as the lock mechanism provided at the short sides of the frame body 10 in the embodiments, however, the invention is not limited to that, but other means may be used as long as the extended state of the frame body 10 can be maintained. Further, the lock mechanism including the protruding portion and the fitting hole has been described as an example as the lock mechanism provided at the long sides of the frame body 10 in the embodiments, however, the invention is not limited to that, but other means may be used as long as the spread state of the frame body 10 can be maintained.

The screen sheet on one side of which the image projection surface is formed has been used in the embodiments, however, the invention is not limited to that, but a screen sheet on both sides of which image projection surfaces are formed may be used.

The case where the respective frame pieces include aluminum frames has been used as an example in the embodiments, however, the invention is not limited to that, but frame pieces made of metal materials other than the aluminum may be used or frame pieces made of other materials such as a resin material may be used, for example.

The plastic plates have been used as the plate-like members in the embodiments, however, the invention is not limited to that, but plate-like members made of other materials may be used. Further, plate-like members having rectangular shapes in a plan view have been used as the plate-like members in the embodiments, however, the invention is not limited to that, but plate-like members having other shapes may be used.

The frame pieces at the short sides and the frame pieces at the long sides have been connected by joint members in the embodiments, however, the invention is not limited to that. For example, the frame piece at the short side (the frame piece 12a shown in FIGS. 1A and 1B) and the frame piece at the long side (the frame piece 12c shown in FIGS. 1A and 1B) may be integrated.

The entire disclosure of Japanese Patent Application No. 2008-028504, filed Feb. 8, 2008 and No. 2008-252651, filed Sep. 30, 2008 are expressly incorporated by reference herein.

What is claimed is:

1. A portable screen comprising:
   a frame body having a rectangular shape; and
   a screen sheet provided with tension within the frame body and having an image projection surface, wherein
   one set of opposing sides of two sets of opposing sides forming the frame body is configured to allow the frame body to be extendable in a first direction parallel to the opposing sides of the one set of opposing sides, each of the opposing sides of the one set of opposing sides including a first frame piece and a second frame piece that is slidable in the first direction relative to the first frame piece,
   the other set of opposing sides of the two sets of opposing sides forming the frame body is configured to allow the frame body to be spreadable or foldable,
   the screen sheet is not attached to either of the opposing sides of the one set of opposing sides of the frame body, and
   the screen sheet is attached to each of the opposing sides of the other set of opposing sides of the frame body.

2. The portable screen according to claim 1, wherein a lock mechanism for maintaining an extended state of the frame body is provided at the one set of opposing sides in the frame body.

3. The portable screen according to claim 1, wherein a lock mechanism for maintaining a spread state of the frame body is provided at the other set of opposing sides in the frame body.

4. The portable screen according to claim 1, wherein the screen sheet is provided with tension within the frame body to make the image projection surface face inside when the frame body is folded up.

5. The portable screen according to claim 1, wherein the screen sheet is provided with tension in the frame body only at the other set of opposing sides in the frame body, and
   plural plate-like members are arranged in parallel along the one set of opposing sides in the first direction at two ends of the one set of opposing sides in the frame body of the ends of the screen sheet.

6. The portable screen according to claim 5, wherein the number of the plate-like members respectively provided at the two ends in the screen sheet is an odd number.

7. The portable screen according to claim 5, wherein fold-back processing for covering both surfaces of the arranged plate-like members by the screen sheet is performed on the respective two ends in the screen sheet.

8. The portable screen according to claim 5, wherein the plate-like member is a plastic plate.

9. The portable screen according to claim 1, wherein the frame body forming the one set of opposing sides includes extendable frames that each include the first frame piece and the second frame piece.

10. The portable screen according to claim 1, wherein the frame body forming the other set of opposing sides includes:
    plural frame pieces; and
    hinge members that rotatably connect the plural frame pieces, respectively.

* * * * *